Sept. 11, 1945.   J. F. O'BRIEN   2,384,487
END CLOSURE MEANS FOR ELECTRIC WIRING UNITS
Filed Nov. 26, 1942
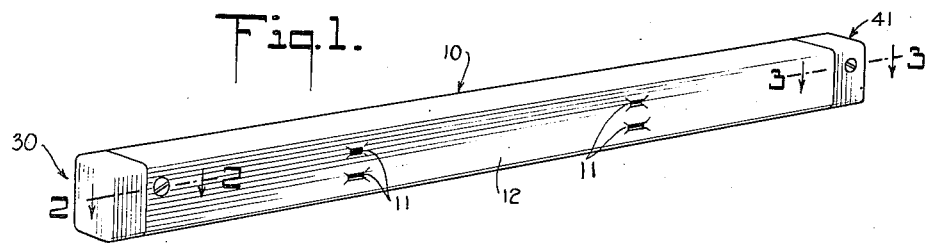
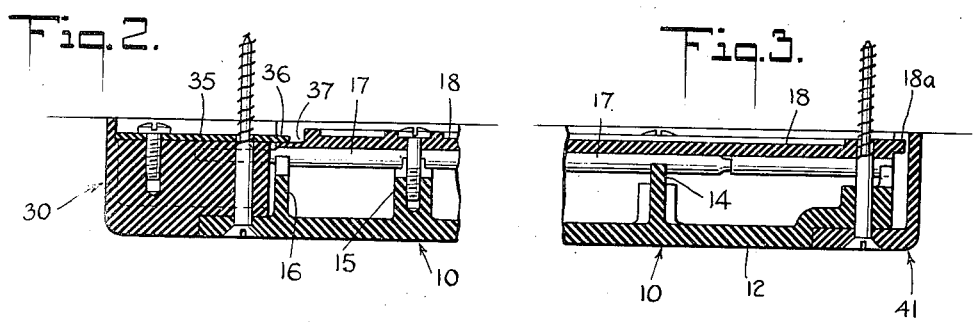
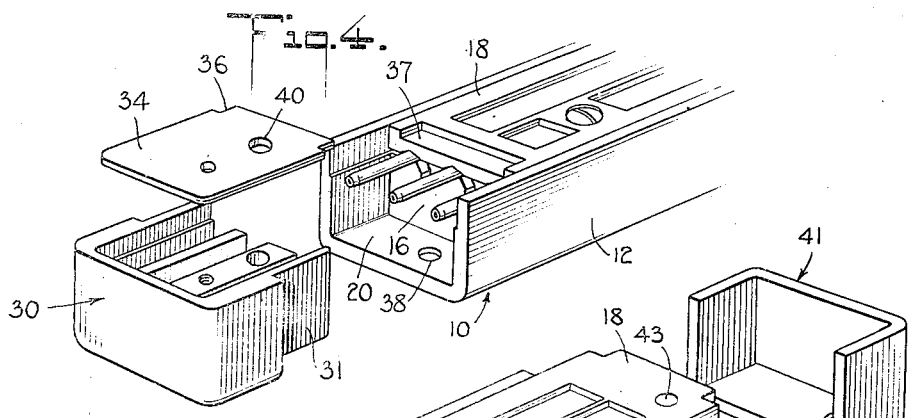
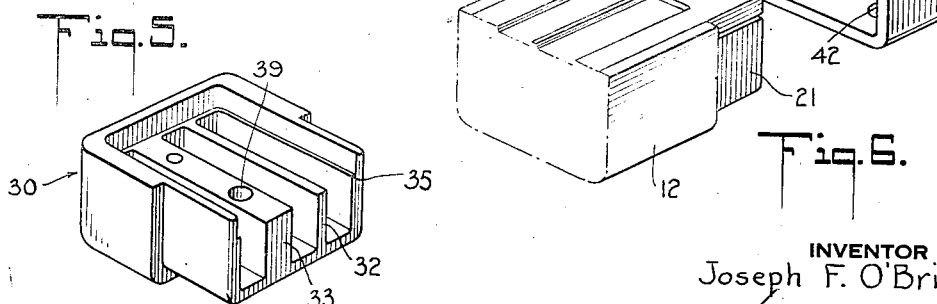
INVENTOR
Joseph F. O'Brien
BY
HIS ATTORNEY Patented Sept. 11, 1945

2,384,487

UNITED STATES PATENT OFFICE 2,384,487

END CLOSURE MEANS FOR ELECTRIC WIRING UNITS

Joseph F. O'Brien, Jersey City, N. J., assignor to John B. Pierce Foundation, New York, N. Y., a corporation of New York Application November 26, 1942, Serial No. 467,031

2 Claims. (Cl. 173—334.1)

This invention relates to improvements in electrical apparatus, and particularly to means for insulatedly enclosing the ends of surface wiring units.

In my presently copending application Serial No. 398,030, filed June 14, 1941, entitled Electricity conductor units with conductor-size adjustment, now U. S. Patent No. 2,351,631, granted June 20, 1944, entitled "Electricity conductor unit" there is disclosed a unit of an electrical wiring system which is adapted for seriatim mechanical and electrical interconnection with similar units to form an electrical circuit of any required length. Said units embody electricity conductors having exposed terminals at each end of a unit; the ends are configurated for male and female interconnection with the adjacent units. The exposed conductor terminals at the end of the last units of a run of units require means to blank off said ends to afford maximum protection against the hazards of short circuit or accidental contact with the exposed conductors, and which preferably will provide a neat closure in harmony with the appearance of the respective units.

It is an object of the present invention to provide end closure means for a unit of an electric wiring system, which will be inexpensive to manufacture and will afford full protection for the conductors of such a unit.

It is an object of the invention to provide end closure means within which the exposed terminals of an electricity conductor unit are housed in mutually spaced insulated relationship.

Further features and advantages will be more fully understood from the following detail description and the accompanying drawing.

In the accompanying drawing:

Fig. 1 is a perspective of a typical unit of a wiring system, provided with end closure means according to the present invention;

Figs. 2 and 3 are sectional elevations on a somewhat enlarged scale, of the male and female closure members, said figures being taken respectively at lines 2—2 and 3—3 of Figure 1;

Fig. 4 is an exploded perspective view of the female end cap and the associated female end of the electricity conductor unit;

Fig. 5 is a perspective view looking down on the underside of the end closure unit of Fig. 4; and Fig. 6 is a perspective view of the male end cap and the associated male end of a conductor unit, said views being similarly taken from the underside of the respective structures.

Referring to the drawing, a unit 10 of an electrical wiring system is typical of any unit which may be electrically connected to a source of electric power (not shown) to provide outlet facilities as indicated in the plug blade receiving slots 11, 11. Said unit 10 may be of the type described and claimed in my aforesaid U. S. Patent No. 2,351,631, in which a substantially hollow body 12 of molded insulated material is provided with a suitable plurality of transverse walls 14, 15, 16, upon which are supported in mutually insulated spaced relationship, any desired plurality of electricity conductors 17. A rear closure plate 18 serves to maintain said conductors 17 in fixed position.

As appears in Figs. 2, 4 and 6, the said hollow body 12 is so configurated that at one end a socket 20 of substantial depth is provided, said socket being defined by the top and side walls of the housing 12 and the end wall 16. At the opposite end of the unit, said hollow body is provided with an extension 21, the external dimensions of which are suitably less than the external dimensions of the hollow body. As is apparent from Figs. 4 and 6, the rear closure plate 18 does not extend beyond the end wall 16 at the socket, i. e., female, end of the unit, but overlies, completely, the extension 21 at the opposite end, i. e., male, end of the unit.

The terminal ends of conductors 17 are exposed within the socket 20 and have a length within said socket at least equal to the length thereof, as indicated in Figs. 2 and 4. At the opposite end of the unit, the conductor terminals are flush with the end of the unit, but have exposed ends. To provide enclosures for the unit in a manner which will shield said exposed terminals against accidental contact, I provide, for the socket, i. e., female, end of the unit, a plug-cap 30 having plug portion 31 which is dimensioned to fit snugly within the socket 20, the break or offset between the head of the plug cap 30 and its portion 31 resting snugly against the end wall surface of the housing 12 to provide a joint therewith which is substantially without visible break or offset.

As shown in Fig. 5, the plug cap 30 is formed with a suitable plurality of longitudinally extending interior walls or septa 32, 33 which form elongate pockets which accommodate the projecting terminals of the conductors 17 and respectively separate said terminals by means of walls of insulation material. To complete the closure, I provide a backing plate 34 of vulcanized fibre, or equivalent, said backing plate fitting within the walls of the plug cap to rest upon the ledge 35 provided therein. An extending foot 36 of plate 34 projects forwardly to fit within a socket 37 in the closure plate 18 of the body 12, and it will be seen from Fig. 2 that the offset relationship of the respective interfitting elements of the plug cap and body 12, is such that direct access to the terminals of conductors 17, from any direction, is adequately prevented.

The body 12 may be provided with an aperture 38 which registers with an aperture 39 provided in the septum 33 of plug cap 30, and with an aperture 40 provided in the backing plate 34 therefor, so that when the plug cap 30 is in position as shown in Fig. 2, a wood screw or like fastening means may serve to hold the plug cap in position and to secure the unit 10 to a wall or other building surface.

At the opposite end of the unit 10, the end closure means comprises a cap member 41, the interior dimension of which is such as to accommodate the projecting end 21 with a relatively tight fit, and the outer dimension of which conforms to the outer dimension of the hollow body 12, whereby the cap fits snugly over the end of the unit, also without visible break or offset.

As shown in Fig. 3, rear closure plate 18 of unit 10 has a forwardly extending foot 18a which normally fits within the socket 37 of a unit 10 when a succession of such units is assembled in end to end relationship. The foot 18a prevents any direct contact, through the rear of the unit, with the terminals of conductors 18; the cap 41 fitting snugly about the extension 21, prevents access from other directions.

Said cap 41 has an aperture 42 therethrough, corresponding in its position with an aperture 43 passing through the body and closure of the unit 10, also for the purpose of accommodating a wood screw for the joint securement of the cap and the fastening of the unit to a wall surface.

Whereas I have described my invention by reference to specific forms thereof, it will be understood that many changes and modifications may be made provided they do not depart from the scope of the claims.

I claim:

1. End closure means for an electrical conductor unit having a three-sided end socket formation and electrical conductors having their ends extending into and exposed within said three-sided end socket formation; said end closure means comprising a plug cap having a three-sided body with a closed end; and further comprising a plug portion extending from said body and dimensioned and contoured to be snugly received within said three-sided end socket formation; longitudinally extending mutually spaced septa of insulating material disposed within said body and its said extending plug portion serving to form longitudinally extending pockets arranged to receive therein the said extending ends of said electrical conductors, and a closure plate for mutually closing said body and said end socket formation at their respective open sides.

2. End closure means for an electrical conductor unit having a three-sided end socket formation and electrical conductors having their ends extending into and exposed within said three-sided end socket formation; said end closure means comprising a plug cap having a three-sided body with a closed end; and further comprising a plug portion extending from said body and dimensioned and contoured to be snugly received within said three-sided end socket formation; longitudinally extending mutually spaced septa of insulating material disposed within said body and its said extending plug portion serving to form longitudinally extending pockets arranged to receive therein the said extending ends of said electrical conductors; a closure plate for mutually closing said body and said end socket formation at their respective open sides, and common means for securing said closure plate with respect to said body and its extending plug portion and the three-sided end socket formation of the electrical conductor unit.

JOSEPH F. O'BRIEN.